(12) United States Patent
Vaidyanathan et al.

(10) Patent No.: US 7,016,668 B2
(45) Date of Patent: Mar. 21, 2006

(54) METHOD AND APPARATUS FOR A RECONFIGURABLE MULTI-MEDIA SYSTEM

(75) Inventors: Krishnamurthy Vaidyanathan, Bangalore (IN); Santhana Krishnamachari, Smyrna, GA (US); Mihaela VanderSchaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 621 days.

(21) Appl. No.: 10/255,327

(22) Filed: Sep. 26, 2002

(65) Prior Publication Data

US 2003/0081580 A1 May 1, 2003

Related U.S. Application Data

(60) Provisional application No. 60/324,905, filed on Sep. 26, 2001.

(51) Int. Cl.
*H04M 3/00* (2006.01)

(52) U.S. Cl. .................... 455/418; 455/419; 455/432.2; 455/552.1; 455/553.1; 370/328; 370/335; 370/342; 375/240.11

(58) Field of Classification Search .............. 455/418, 455/419, 432.2, 552.1, 553.1; 370/328, 335, 370/342; 375/240.11
See application file for complete search history.

(56) References Cited

U.S. PATENT DOCUMENTS

| | | | |
|---|---|---|---|
| 2002/0054578 A1 * | 5/2002 | Zhang et al. | 370/328 |
| 2003/0050055 A1 * | 3/2003 | Ting et al. | 455/419 |
| 2004/0264567 A1 * | 12/2004 | Xu et al. | 375/240.11 |
| 2005/0157677 A1 * | 7/2005 | Dowling | 370/328 |

* cited by examiner

*Primary Examiner*—Doris H. To
*Assistant Examiner*—Sanh Phu

(57) ABSTRACT

A reconfigurable multi-media system, method and device provides monitoring and reconfiguration of a plurality of communication layers of a communications stack to dynamically reconfigure the modulation and coding of software defined radio (SDR). The system includes a software object radio (SWR) library having reconfigurable object specification, design and performance parameters, the SWR is adapted for at least one of transmitting and receiving multi-media content via wireless communication; a controller in communication with the SWR library; a power management device module in communication with said controller; a reconfigurable encoder/decoder in communication with said controller to provide the SWR with dynamic coding information for modulation; a TCP/IP interface in communication with said reconfigurable encoder/decoder and said controller; and an application layer comprising a link layer and a reconfigurable physical layer in communication with each other and said controller, the physical layer adapted for communication with a channel, and the application layer including at least one driver for multi-media delivery. The controller monitors the physical layer and link layer information and the reconfigurable encoder/decoder dynamically reconfigures modulation and coding of multi-media content according to a cross-layer optimization approach.

11 Claims, 3 Drawing Sheets

METHOD AND APPARATUS FOR A RECONFIGURABLE MULTI-MEDIA SYSTEM

This application claims priority from U.S. provisional application 60/324,905 filed Sep. 26, 2001.

BACKGROUND OF THE INVENTION

1. Field of Invention

The invention is related to the software radio technology. More particularly, the invention is related to reconfiguring software radio technology based on a higher layer application, traffic, channel condition, and/or receiver characteristics.

2. Description of Related Art

Software Defined Radio (SDR) Technology is a state of the art term for achieving for interface re-configurability. SDR achieves limited programmability through parameterized control of the physical layer, and is limited to base station implementations where size, weight, power and cost are not very critical. The term software defined radios is used to describe radios that provide software control of a variety of modulation techniques, wide-band or narrow-band operation, communications security functions (such as hopping), and waveform requirements of current and evolving standards over a broad frequency range.

As future wireless networks are expected to constantly evolve, and newer multi-media service are carried increasingly on unlicensed spectral bands, these changes necessitate support for multiple air-interface standards. The support for multiple air-interface standards requires reconfigurability of the physical layer of the consumer terminal over time, as new standards emerge, and over space, as in roaming where the mobile terminal moves into an area with a different access network.

In addition, reconfigurability will be needed based on the type of multi-media content being delivered, and the types and capabilities of devices exchanging such content. In particular, the need for programmable architectures that look beyond Digital Signal Processors and Microprocessors is needed. However, to date, no known software radio architecture exists that has been applied to wireless networks carrying multimedia traffic.

SUMMARY OF THE INVENTION

According to an aspect,of the present invention, the same modem device will be reconfigured to implement the desired air interface. Device programmability will not be restricted to parameter downloads. Instead, a complete specification of the hardware functionality can be downloaded, thus making it a fully programmable solution. An intelligent controllers adds information about the nature of the traffic (data) that is being sent, the transmitter/receiver device power restrictions, as well as the channel condition in reconfiguring the modem device. Thus, the device programmability is not agnostic to the traffic that is being transmitted by the device.

DETAILED DESCRIPTION OF THE INVENTION

Figure 1:
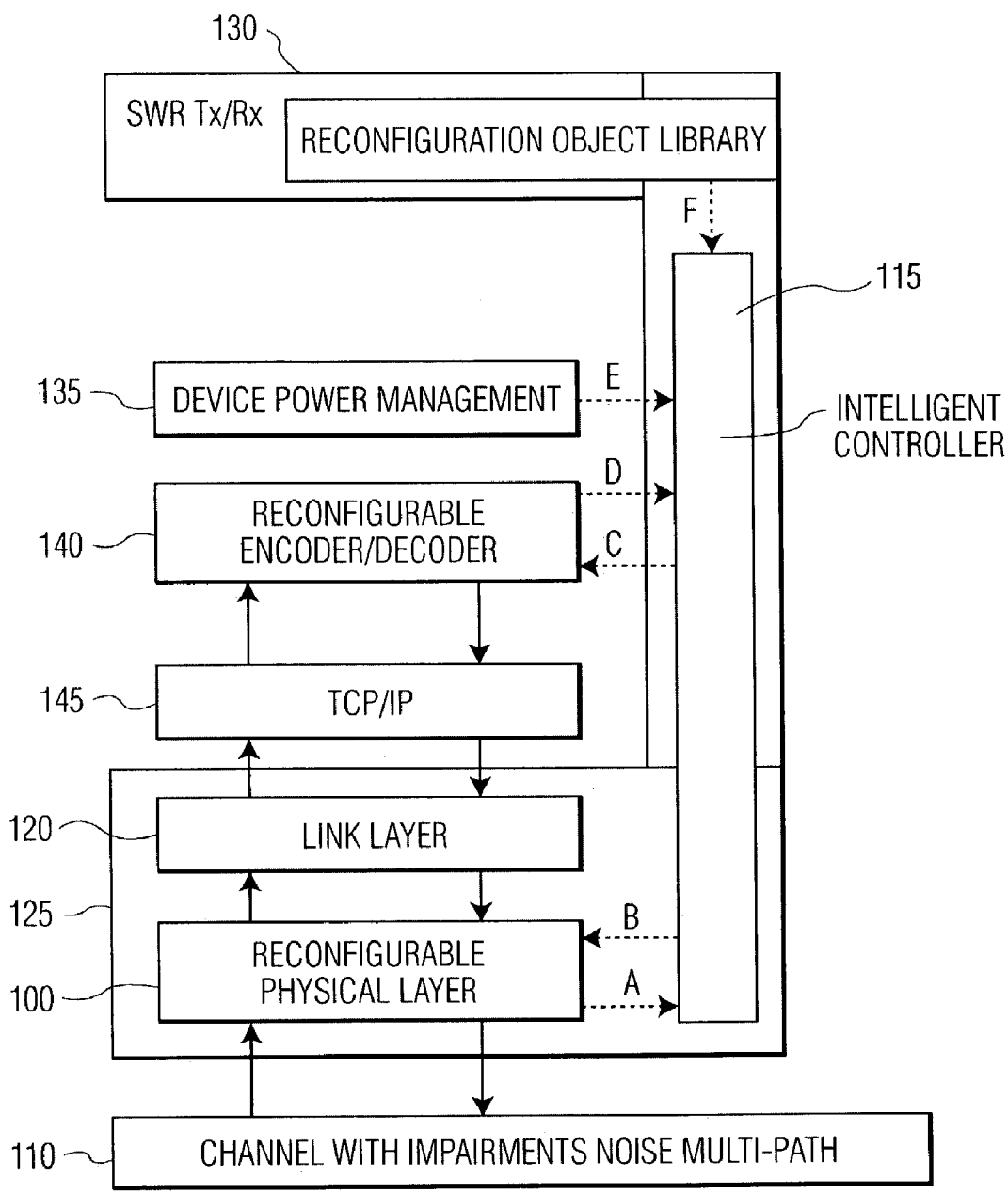
FIG. 1 shows a first aspect of one configuration of architecture of the present invention.

As shown in FIG. 1, there is a proposed system architecture for a Software Defined Radio based Multimedia System according to an aspect of the present invention.

Although examples of reconfigurable encoders/decoders are described below in conjunction with FIG. 1, it should be understood by a person of ordinary skill in the art that the aspects discussed are provided for purposes of illustration and not limitation, and there are many other types of systems that lie within the spirit of the invention and the scope of the appended claims. For example, standard video techniques like MPEG as well as wavelet-based coding techniques can be employed. An important feature of such algorithms is that they are either reconfigurable in features (allowing for complexity and scalability) or in their robustness to packet-losses. Hence, trade-offs between coding efficiency, complexity and resilience can be made, leading to reconfigurable encoders/decoders.

To enhance the commercial viability of the instant invention, it is preferred that the cost-flexibility trade-off is optimal for an SDR that is to be used as a consumer terminal.

The solid arrows in FIG. 1 show the data flow across the various layers in the communication stack. As shown in the Figure, a reconfigurable physical layer 100 communicates with channel 110 and intelligent controller 115. The link layer 120 and physical layer 100 form an application layer 125. The application layer includes application drivers. Two examples of such drivers are (1) robust multi-media delivery, and (2) bit rate and complexity scalable multi-media delivery. The stack may include a device power management module 135, a reconfigurable decoder/encoder 140 and a TCP/IP interface 145.

With regard to robust multi-media delivery, it is necessary to take into account the various factors that affect QoS over wireless networks. These factors span different layers of the protocol stack shown in FIG. 1, starting at the physical layer 100 with a variation in channel characteristics caused by multi-path fading and user mobility, and including the link layer 120 with the variation in the characteristics of the data stream to be transported. According to an aspect of the instant invention, it is necessary to pursue a cross-layer optimization approach. The modulation must be dynamically reconfigured and coding techniques reconfigured at the physical layer based on the channel characteristics and device power restrictions. This process will be achieved through the technologies developed based on Software radio (SWR) concepts.

With regard to bit-rate and complexity scalable multi-media delivery, there should be a universal coding of video content so that it can be transmitted over networks with varying characteristics and constraints by employing, for example, techniques such as MPEG-4 FGS or 3-D wavelets. An important paradigm from the 4G wireless access perspective can be the way that Universal Multimedia Access (UMA) refers to how multimedia data can be accessed by a large number of users/clients to view any desired video stream anytime and from anywhere. In the UMA framework, multimedia information is accessed from the network depending on the following three parameters: user preference, channel characteristics and device capabilities. Thus, scalable coding techniques that are reconfigurable can be employed. These scalable coding techniques permit receiver-driven scalable video techniques that allow streaming according to the capabilities of diverse clients (devices) and the experienced network conditions.

Furthermore, the corresponding cross-layer protection strategies for scalable video over 4G wireless networks can be employed since the network layers need to cooperate with the application to support bandwidth adaptation rather than insulate applications from variations in underlying QoS.

According to the present invention, the system architecture is such that the radio layers are reconfigured in a content aware fashion, which means that the timing of the reconfiguration and its specification has to be performed across the various layers of the stack. The intelligent controller 115 straddles the various layers. It is also seen in FIG. 1 from the broken arrows that some of the signals that need to be exchanged between the stack and the controller. In addition, the reconfiguration is generated jointly, based on the information from both the application layer and the physical layer.

The SWR library module 130 is adapted for at least one of transmission and receiving capability (Tx/Rx). The SWR library module includes reconfigurable objection specification, design and performance parameters. The SWR is reconfigured according to a series of factors of the protocol stack that affect the Quality of Service (QoS) of wireless networks. The intelligent controller 115 adds the information about the nature of the traffic (data being sent), the transmitter/receiver device power restrictions from communication with Device Power Management module 135. For instance, the local device power management request would be received by the controller 115 from the device power management module 135.

The intelligent controller makes the decision to appropriately reconfigure the software radio (SWR) according to the data collected at the various layers of the stack. This process is referred to as a cross-optimization approach, heretofore unknown. The algorithm that takes into account the monitoring of the various layers can use standard video techniques such as MPEG, wavelet based-coding, MPEG2-4, etc., can be employed. What is required of the algorithm is that it is either reconfigurable in features (allowing for scalability) or in robustness to packet losses.

Figure 2A:
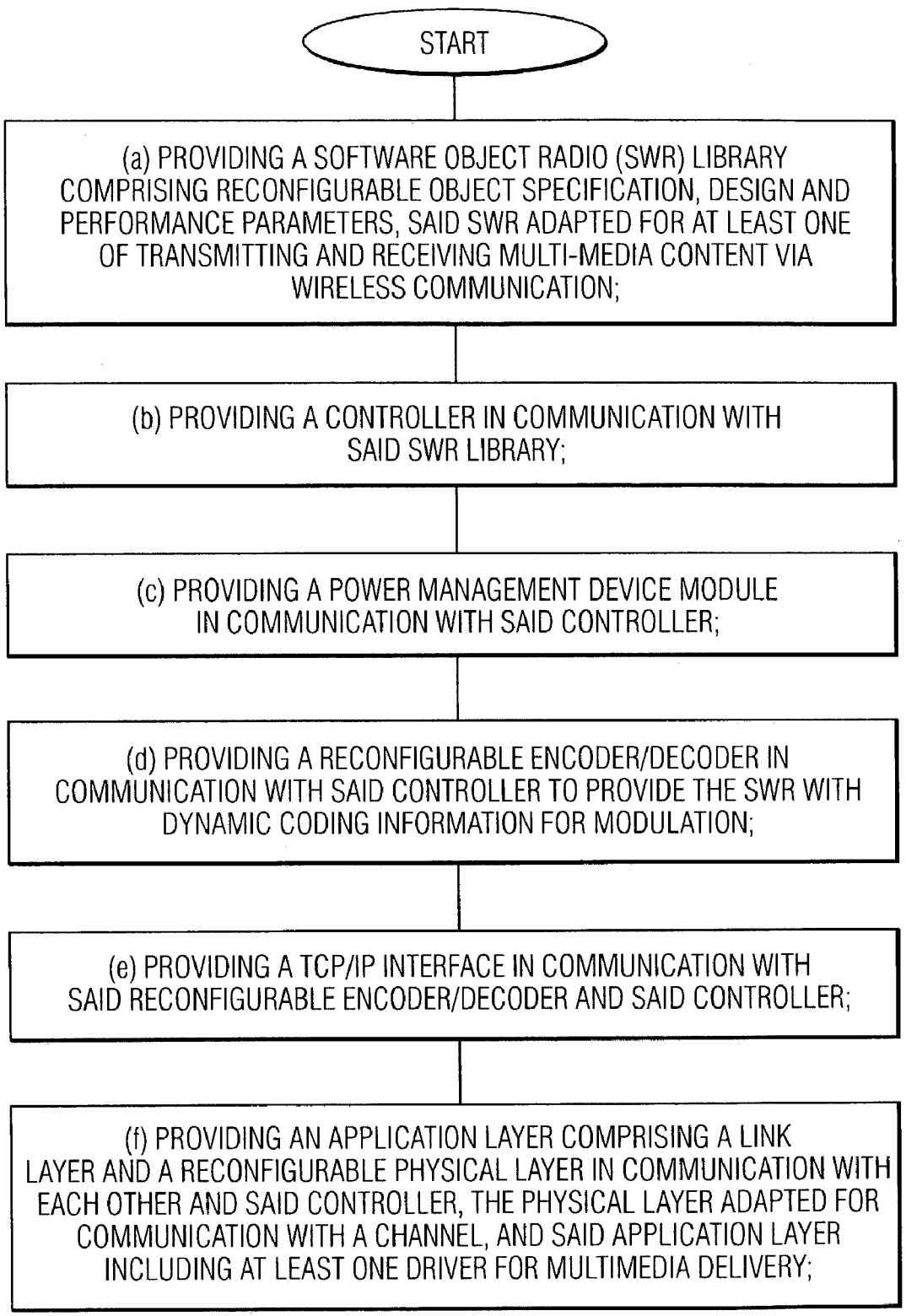
FIGS. 2A and 2B provide a flowchart providing a brief overview of one aspect of a method according to the present invention.
Figure 2B:
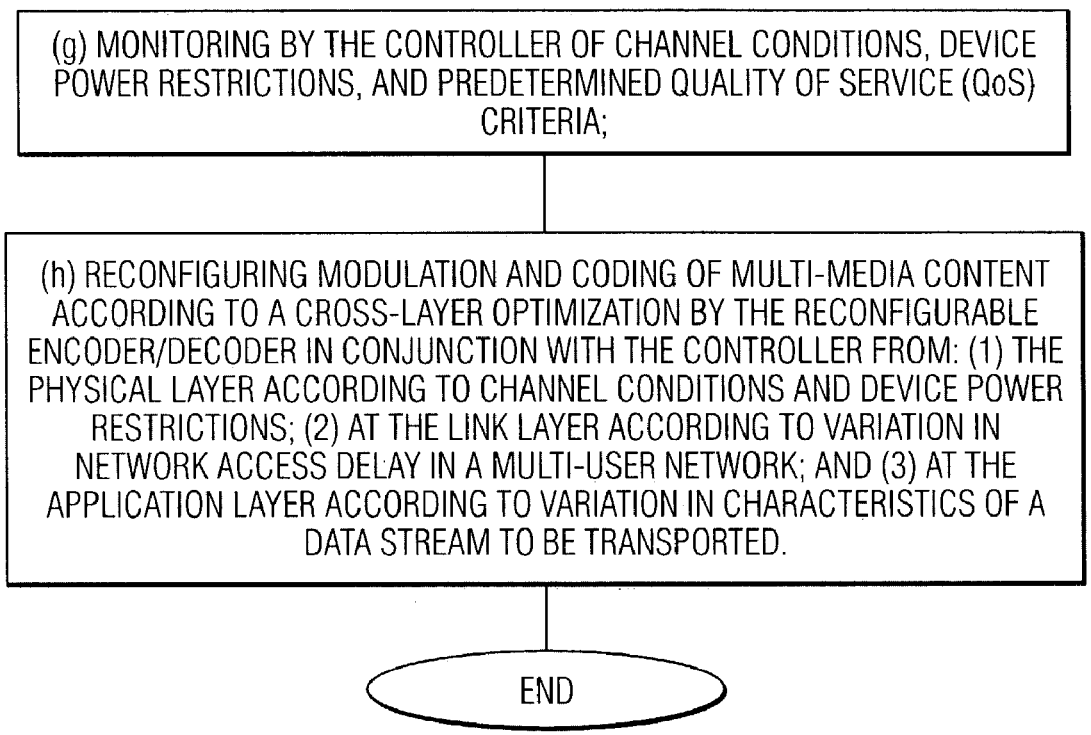

FIGS. 2A and 2B illustrate an overview of one aspect of a method according to the present invention.

At step (a) of FIG. 2A an SWR library module comprising reconfigurable object specification, design and performance parameters are provided.

At step (b), a controller is provided in communication with the SWR library module.

At step (c), a power management device module is in communication with the controller.

At step (d), a reconfigurable decoder/encoder is provides the SWR with dynamic coding information for modulation.

At step (e), a TCP/IP interface is provided in communication with the decoder and the controller.

At step (f), the application layer is provided comprising a link layer and a reconfigurable physical layer, the physical layer is adapted for communication a channel, and the application layer contains at least one driver for multi-media delivery.

At step (g), the controller monitors channel conditions, power restrictions and predetermined QoS criteria of the stack of layer layers, such as the physical layer, application layer, and the device power management layer.

At step (h), there is a reconfiguring of modulation and/or encoding/decoding dynamically in accordance with changing conditions of the layers monitored by the controller. The reconfiguring can be according to known reconfigurable algorithms or specifically written for a device or devices.

Thus there is a dynamic system for multi-media delivery that uses a cross-layer optimization approach to enhance multi-media delivery.

In conjunction with the intelligent controller, the encoder/decoder module 140 reconfigures modulation and coding according to information regarding channel conditions from the physical layer, device power restrictions, and characteristics of the data stream to be transported. While the instant inventions in a best mode performs reconfiguration according to all of the above criteria, it is possible that the reconfiguration could be according to one or some of the above criteria, or additional criteria. It should also be understood that in addition to a system for delivering multi-media content according to the present invention, a modem comprising the reconfigurable encoder/decoder and a controller to monitor and dynamically reconfigure the modulation and/or encoding/decoding of the encoder/decoder according to monitoring of the various stack layers of a communication stack of SWR is also part of the claimed invention.

What is claimed:

1. A reconfigurable multi-media system comprising:
    a software object radio (SWR) library 130 comprising reconfigurable object specification, design and performance parameters, said SWR adapted for at least one of transmitting and receiving multi-media content via wireless communication;
    a controller 115 in communication with said SWR library;
    a power management device module 135 in communication with said controller;
    a reconfigurable encoder/decoder 140 in communication with said controller to provide the SWR with dynamic coding information for modulation;
    a TCP/IP interface 145 in communication with said reconfigurable encoder/decoder and said controller; and
    an application layer 125 comprising a link layer 120 and a reconfigurable physical layer 100 in communication with each other and said controller 115, the physical layer adapted for communication with a channel 110, and said application layer including at least one driver for multimedia delivery;
    wherein the controller 115 monitors the physical layer 100 and link layer 120 information, and the reconfigurable encoder/decoder 140 dynamically reconfigures modulation and coding of multi-media content according to a cross-layer optimization approach in conjunction with the controller from: (a) the physical layer 100 according to channel conditions and device power restrictions; (b) the link layer 120 according to variation in network access delay in a multi-user network; and (c) the application layer 125 according to variation in characteristics of a data stream to be transported.

2. The system according to claim 1, wherein the reconfigurable encoder/decoder 140 uses wavelet-based coding during cross-layer optimization.

3. The system according to claim 1, wherein the reconfigurable encoder/decoder 140 uses MPEG coding during cross-layer optimization.

4. The system according to claim 1, wherein the reconfigurable encoder/decoder 140 uses 3-D wavelet coding.

5. The system according to claim 1, wherein the power management device module 135 operates according to predetermined Quality of Service (QoS) criteria supplied thereto.

6. The system according to claim 1, wherein the controller 115 and reconfigurable encoder/decoder 140 further comprise a reconfigurable modem device adapted to implement a desired air interface with a Software Defined Radio (SDR).

7. A method for providing a reconfigurable multi-media system comprising the steps of:
   (a) providing a software object radio (SWR) library comprising reconfigurable object specification, design and performance parameters, said SWR adapted for at least one of transmitting and receiving multi-media content via wireless communication;
   (b) providing a controller in communication with said SWR library;
   (c) providing a power management device module in communication with said controller;
   (d) providing a reconfigurable encoder/decoder in communication with said controller to provide the SWR with dynamic coding information for modulation;
   (e) providing a TCP/IP interface in communication with said reconfigurable encoder/decoder and said controller; and
   (f) providing an application layer comprising a link layer and a reconfigurable physical layer in communication with each other and said controller, the physical layer adapted for communication with a channel, and said application layer including at least one driver for multimedia delivery;
   (g) monitoring by the controller of channel conditions, device power restrictions, and predetermined Quality of Service (QoS) criteria;
   (h) reconfiguring modulation and coding of multi-media content according to a cross-layer optimization by the reconfigurable encoder/decoder in conjunction with the controller from: (1) the physical layer according to channel conditions and device power restrictions; (2) at the link layer according to variation in network access delay in a multi-user network; and (3) at the application layer according to variation in characteristics of a data stream to be transported.

8. The method according to claim 7, wherein the reconfigurable encoder/decoder 140 uses wavelet-based coding during cross-layer optimization.

9. The method according to claim 7, wherein the reconfigurable encoder/decoder 140 using MPEG algorithms during cross-layer optimization.

10. The method according to claim 7, wherein the reconfigurable encoder/decoder 140 uses 3-D wavelet algorithms.

11. The method according to claim 7, wherein the power management device module 135 operates according to predetermined Quality of Service (QoS) criteria supplied thereto.

* * * * *